US011799857B2

(12) United States Patent
Michaud et al.

(10) Patent No.: US 11,799,857 B2
(45) Date of Patent: Oct. 24, 2023

(54) SOFTWARE POSTURE FOR ZERO TRUST ACCESS

(71) Applicant: Cisco Technology, Inc., San Jose, CA (US)

(72) Inventors: Frank Michaud, Pully (CH); Peshan Sampath Kalu Marakkala, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 232 days.

(21) Appl. No.: 17/462,248

(22) Filed: Aug. 31, 2021

(65) Prior Publication Data

US 2023/0061141 A1    Mar. 2, 2023

(51) Int. Cl.
*H04L 9/40* (2022.01)

(52) U.S. Cl.
CPC .......... *H04L 63/0884* (2013.01); *H04L 63/10* (2013.01)

(58) Field of Classification Search
CPC ............................ H04L 63/0884; H04L 63/10
USPC ............................................................ 726/3
See application file for complete search history.

(56) References Cited

U.S. PATENT DOCUMENTS

| 8,782,434 | B1 * | 7/2014 | Ghose | .................. | G06F 9/3863 |
| | | | | | 712/216 |
| 8,782,435 | B1 * | 7/2014 | Ghose | .................. | H04L 9/3247 |
| | | | | | 712/216 |
| 8,806,640 | B2 * | 8/2014 | Wang | ...................... | G06F 21/54 |
| | | | | | 713/176 |
| 10,073,975 | B2 * | 9/2018 | Ferrara | ............... | H04L 63/1433 |
| 11,455,388 | B1 * | 9/2022 | Jones | .................... | G06F 21/566 |
| 2009/0158407 | A1 | 6/2009 | Nicodemus et al. | | |
| 2010/0131581 | A1 | 5/2010 | Jibbe et al. | | |
| 2012/0151206 | A1 * | 6/2012 | Paris | ...................... | H04L 63/08 |
| | | | | | 726/5 |
| 2017/0323120 | A1 * | 11/2017 | Anderson | ............. | G06F 21/121 |
| 2018/0109387 | A1 | 4/2018 | Vyas et al. | | |
| 2019/0163925 | A1 | 5/2019 | Jiang et al. | | |

(Continued)

FOREIGN PATENT DOCUMENTS

| CN | 102833259 | A | * | 12/2012 | | |
| CN | 103714290 | | | 4/2014 | | |
| EP | 2304638 | B1 | * | 3/2018 | ......... | G06F 12/0246 |

(Continued)

OTHER PUBLICATIONS

Wang et al., "Verification of Implementations of Cryptographic Hash Functions," in IEEE Access, vol. 5, pp. 7816-7825, 2017, doi: 10.1109/ACCESS.2017.2697918. (Year: 2017).*

(Continued)

*Primary Examiner* — Peter C Shaw
(74) *Attorney, Agent, or Firm* — Polsinelli

(57) ABSTRACT

Disclosed are methods, systems, and non-transitory computer-readable storage media for evaluating software posture as a condition of zero trust access. The present technology provides a client-side validation agent and a validation service which in tandem can capture and evaluate data representative of parameters associated with an application executing on a user device. The validation service can validate the application to a networked service, and in turn the networked service can permit communication to the application running on the user device.

13 Claims, 4 Drawing Sheets

(56) References Cited

U.S. PATENT DOCUMENTS

2021/0029151 A1* 1/2021 Brooks ................ H04L 9/3218
2021/0044623 A1   2/2021 Bosch et al.

FOREIGN PATENT DOCUMENTS

| EP | 3471006 B1 | * | 12/2021 | ............. G06F 21/54 |
| JP | 7154365 B2 | * | 10/2022 | ........... G06F 21/125 |
| KR | 20140051163 A | * | 4/2014 | ............. G06F 21/00 |
| WO | WO-2022233394 A1 | * | 11/2022 | |

OTHER PUBLICATIONS

Nikishova et al., "Software Integrity Control," 2019 International Russian Automation Conference (RusAutoCon), Sochi, Russia, 2019, pp. 1-5, doi: 10.1109/RUSAUTOCON.2019.8867606. (Year: 2019).*

Ramachandran et al., "A remote attestation infrastructure for verifying the application of software updates," 2017 IFIP/IEEE Symposium on Integrated Network and Service Management (IM), Lisbon, Portugal, 2017, pp. 317-325, doi: 10.23919/INM.2017.7987294. (Year: 2017).*

Khan et al., "A cryptographic primitive based authentication scheme for run-time software of embedded systems," Mumbai, India, 2010, pp. 500-504, doi: 10.1109/ICRESH.2010.5779601. (Year: 2010).*

Rozenblit, "Secure Software Distribution," Proceedings of NOMS '94—IEEE Network Operations and Management Symposium, Kissimmee, FL, USA, 1994, pp. 486-496, doi: 10.1109/NOMS.1994.644144. (Year: 1994).*

\* cited by examiner

300

310 Storing, by a validation service, data representative of expected parameters associated with an application on a user device

320 Receiving, from a validation agent running on the user device, data representative of parameters associated with the application executing on the user device, wherein the application executing on the user device is attempting to gain access to a networked service

330 Comparing, by the validation service, the data representative of expected parameters associated with the application on the user device with the data representative of parameters associated with the application executing on the user device

340 When the data representative of expected parameters associated with the application on the user device matches the data representative of parameters associated with the application executing on the user device, generating, by the validation service, a validation code for the application based on the parameters

350 sending, to the user device, the validation code

360 Receiving, from the networked service, a request for validation of the validation code

370 Sending, to the networked service, a validation of the validation code, whereby the networked service permits further communication with the application executing on the user device

FIG. 3

SOFTWARE POSTURE FOR ZERO TRUST ACCESS

DESCRIPTION OF THE RELATED TECHNOLOGY

The subject matter of this disclosure relates in general to zero trust access, and more specifically to evaluating software posture as a condition of zero trust access.

BACKGROUND

More and more enterprises are moving to a zero trust model of security. Zero trust models emphasize that, by default, users, devices, or other entities should not be trusted. When attempting to gain access to a resource, these entities must provide sufficient credentials. The zero trust model starts from zero trust in an entity and builds up trust through credentialing, including evaluation of user identity posture, device posture, or network environment posture.

However, current zero trust models may not evaluate the security of applications or code from which access requests are made. This is a serious security problem, as such requests or other transactions can be recorded or replayed by rogue applications, application code can be manipulated, or execution flow can be altered. These are only a few examples of the security risks that unevaluated software postures pose.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates a flowchart of an example method for evaluating software posture as a condition of zero trust access, in accordance with some embodiments of the present disclosure.

DETAILED DESCRIPTION

Figure 1:
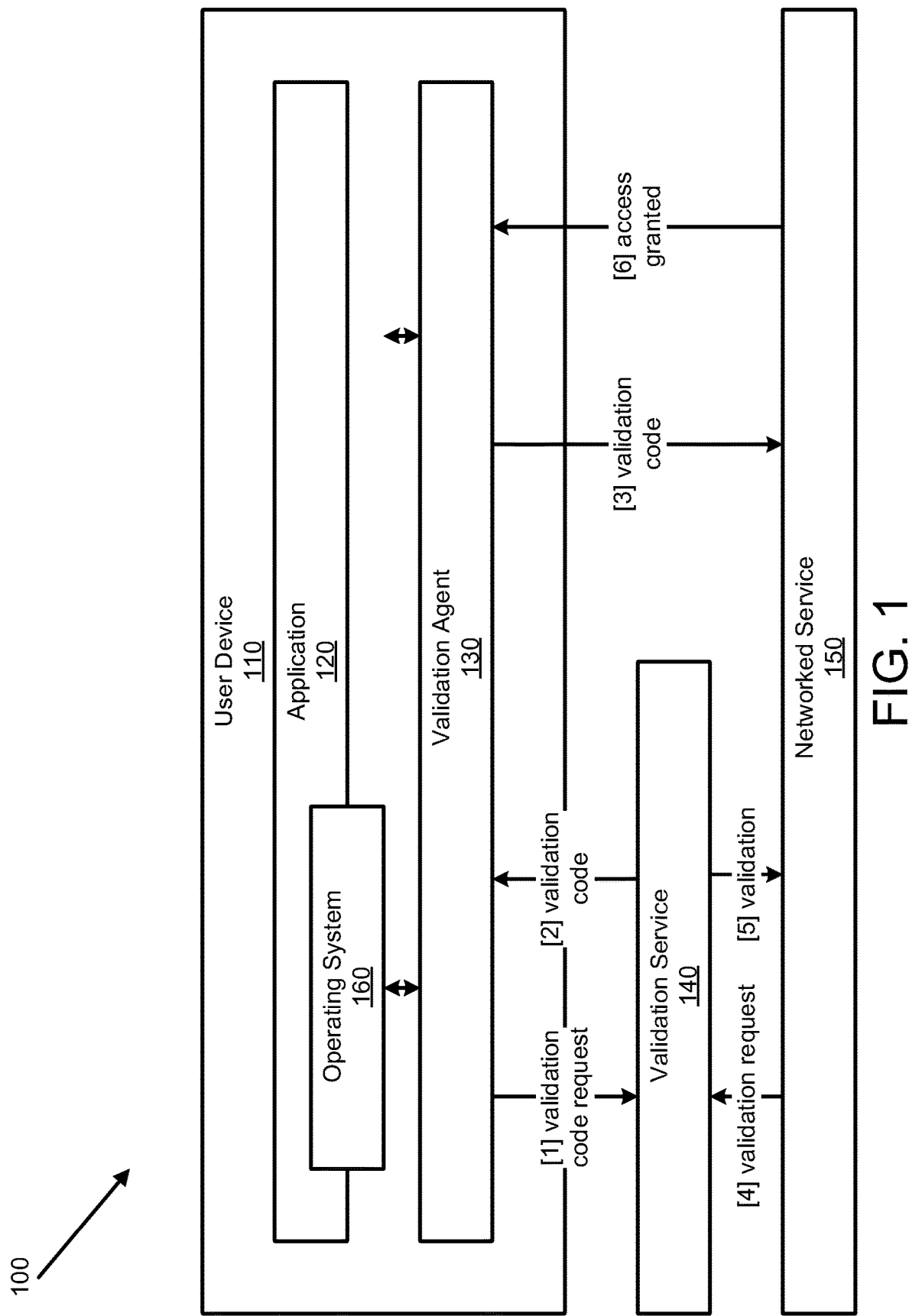
FIG. 1 illustrates an example system for evaluating software posture as a condition of zero trust access, in accordance with some embodiments of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Aspects of the present disclosure are directed to evaluating software posture as a condition of zero trust access.

A method can include storing, by a validation service, data representative of expected parameters associated with the application on the user device. The method can also include receiving, from a validation agent running on the user device, data representative of parameters associated with the application executing on the user device, wherein the application executing on the user device is attempting to gain access to a networked service. The method can also include comparing, by the validation service, the data representative of expected parameters associated with the application on the user device with the data representative of parameters associated with the application executing on the user device. The method can also include, when the data representative of expected parameters associated with the application on the user device matches the data representative of parameters associated with the application executing on the user device, generating, by the validation service, a validation code for the application based on the parameters. The method can also include sending, to the user device, the validation code. The method can also include receiving, from the networked service, a request for validation of the validation code. The method can also include sending, to the networked service, a validation of the validation code, whereby the networked service permits further communications with the application executing on the user device.

In some embodiments, the method can include storing data representative of expected parameters associated with a second application on the user device, wherein the second application can integrate with the application. The method can also include receiving, from the validation agent running on the user device, data representative of parameters associated with the second application executing on the user device, wherein the second application is integrated with the application. The method can also include comparing, by the validation service, the data representative of expected parameters associated with the second application on the user device with the data representative of parameters associated with the second application executing on the user device.

In some embodiments of the method, the data representative of expected parameters associated with the application on the user device can include a hash derived from expected parameters for the application during runtime on a given operating system.

In some embodiments of the method, the expected parameters for the application can relate to stateless aspects of code during runtime on the given operating system.

In some embodiments of the method, the data representative of expected parameters associated with the application on the user device can include static aspects of the application.

In some embodiments of the method, the data representative of expected parameters associated with the application on the user device can include application deployment attributes that characterize a healthy version of the application on a particular version of an operating system.

In some embodiments of the method, the data representative of expected parameters associated with the application on the user device can include runtime attributes.

In some embodiments, the method can include registering runtime information of code associated with the application. The method can also include registering the networked service with the validation service.

A system can include one or more processors and at least one computer-readable storage medium having instructions stored thereon, wherein the instructions, when executed by the one or more processors, are effective to cause the one or more processors to store, by a validation service, data representative of expected parameters associated with the application on the user device. The instructions, when executed by the one or more processors, can also be effective to cause the one or more processors to receive, from a validation agent running on the user device, data representative of parameters associated with the application executing on the user device, wherein the application executing on the user device is attempting to gain access to a networked service. The instructions, when executed by the one or more processors, can also be effective to cause the one or more processors to compare, by the validation service, the data representative of expected parameters associated with the application on the user device with the data representative of parameters associated with the application executing on the user device. The instructions, when executed by the one or more processors, can also be effective to cause the one or more processors to, when the data representative of expected parameters associated with the application on the user device matches the data representative of parameters associated with the application executing on the user device, generate, by the validation service, a validation code for the application based on the parameters. The instructions, when executed by the one or more processors, can also be effective to cause the one or more processors to send, to the user device, the validation code. The instructions, when executed by the one or more processors, can also be effective to cause the one or more processors to receive, from the networked service, a request for validation of the validation code. The instructions, when executed by the one or more processors, can also be effective to cause the one or more processors to send, to the networked service, a validation of the validation code, whereby the networked service permits further communications with the application executing on the user device.

A non-transitory computer-readable storage medium can include instructions stored thereon, wherein the instructions, when executed by a processor, are effective to cause the processor to store, by a validation service, data representative of expected parameters associated with the application on the user device. The instructions, when executed by the processor, can also be effective to cause the processor to receive, from a validation agent running on the user device, data representative of parameters associated with the application executing on the user device, wherein the application executing on the user device is attempting to gain access to a networked service. The instructions, when executed by the processor, can also be effective to cause the processor to compare, by the validation service, the data representative of expected parameters associated with the application on the user device with the data representative of parameters associated with the application executing on the user device. The instructions, when executed by the processor, can also be effective to cause the processor to when the data representative of expected parameters associated with the application on the user device matches the data representative of parameters associated with the application executing on the user device, generate, by the validation service, a validation code for the application based on the parameters. The instructions, when executed by the processor, can also be effective to cause the processor to send, to the user device, the validation code. The instructions, when executed by the processor, can also be effective to cause the processor to receive, from the networked service, a request for validation of the validation code. The instructions, when executed by the processor, can also be effective to cause the processor to send, to the networked service, a validation of the validation code, whereby the networked service permits further communications with the application executing on the user device.

EXAMPLE EMBODIMENTS

Zero trust models are predicated on this idea: "never trust, always verify." In zero trust models, entities should not be trusted, and only after a validation process should they be trusted in accordance with that validation. User identity posture, device posture, and networking environment posture are all factors which are validated through existing zero trust protocols.

However, current solutions do not incorporate a software posture which would validate the integrity of software. By failing to incorporate a software posture, zero trust models leave themselves vulnerable to certain types of attacks. For example, transmissions can be recorded and replayed, code can be manipulated, and execution flow can be altered by untrustworthy software. The attacks which are possible through compromised software can be serious and represent a known security flaw.

Consider, for example, a malicious actor which has infiltrated a mobile banking application and altered its codebase. To a user, the application may appear as normal. A zero trust model evaluating user identity posture, device posture, and networking environment posture would not detect such an attack. This attack could result in heavy financial losses for a user, resulting in hardship and decreased trust in the bank providing the mobile banking application.

The present technology discloses means to address this problem by evaluating software posture as a condition for zero trust access. This solution is achieved by implementing a client-side validation agent on a user device to gather data about any software relevant to a zero trust access protocol. This data can be sent to a validation service, which can validate the software and facilitate secure access to a networked service.

FIG. 1 illustrates an example system 100 for evaluating software posture as a condition of zero trust access, in accordance with some embodiments of the present disclosure. Validation service 140 can validate the software posture of application 120 running on operating system 160 to networked service 150, which can grant access to user device 110 based on the validation.

User device 110 can be any computing device capable of running application 120 and communicating with validation service 140 and networked service 150. For example, user device 110 can be a smartphone, tablet, laptop, personal computer, or other computing device. Application 120 can be any application which can run on operating system 160 on user device 110 and can access networked service 150. For example, application 120 can be a Facebook application and networked service 150 can be a Facebook server. In another example, application 120 can be an eCommerce application, such as Amazon, and networked service 150 can be a payment service, such as PayPal. An operating system 160 can be, for example, iOS, Android, Windows, macOS, a Linux distribution, or another operating system.

Validation agent 130 can run on user device 110. Validation agent 130 can intercept requests made from or to application 120. Validation agent 130 can, in tandem with validation service 140, validate the software posture of application 120. Validation service 140 can be, for example, a standalone computing device or a program running on user device 110, networked service 150, or another device. Validation service 140 can communicate with user device 110 or networked service 150 over, for example, Wi-Fi, Bluetooth, near-field transmission protocols, or other communication schemes.

When application 120 requests access to networked service 150, validation agent 130 can send a validation code request to validation service 140. The validation code request can include data representative of parameters associated with application 120 executing on user device 110. Validation agent 130 can intercept the request by application 120 to access networked service 150, or validation agent 130 can preempt the request.

Figure 2:
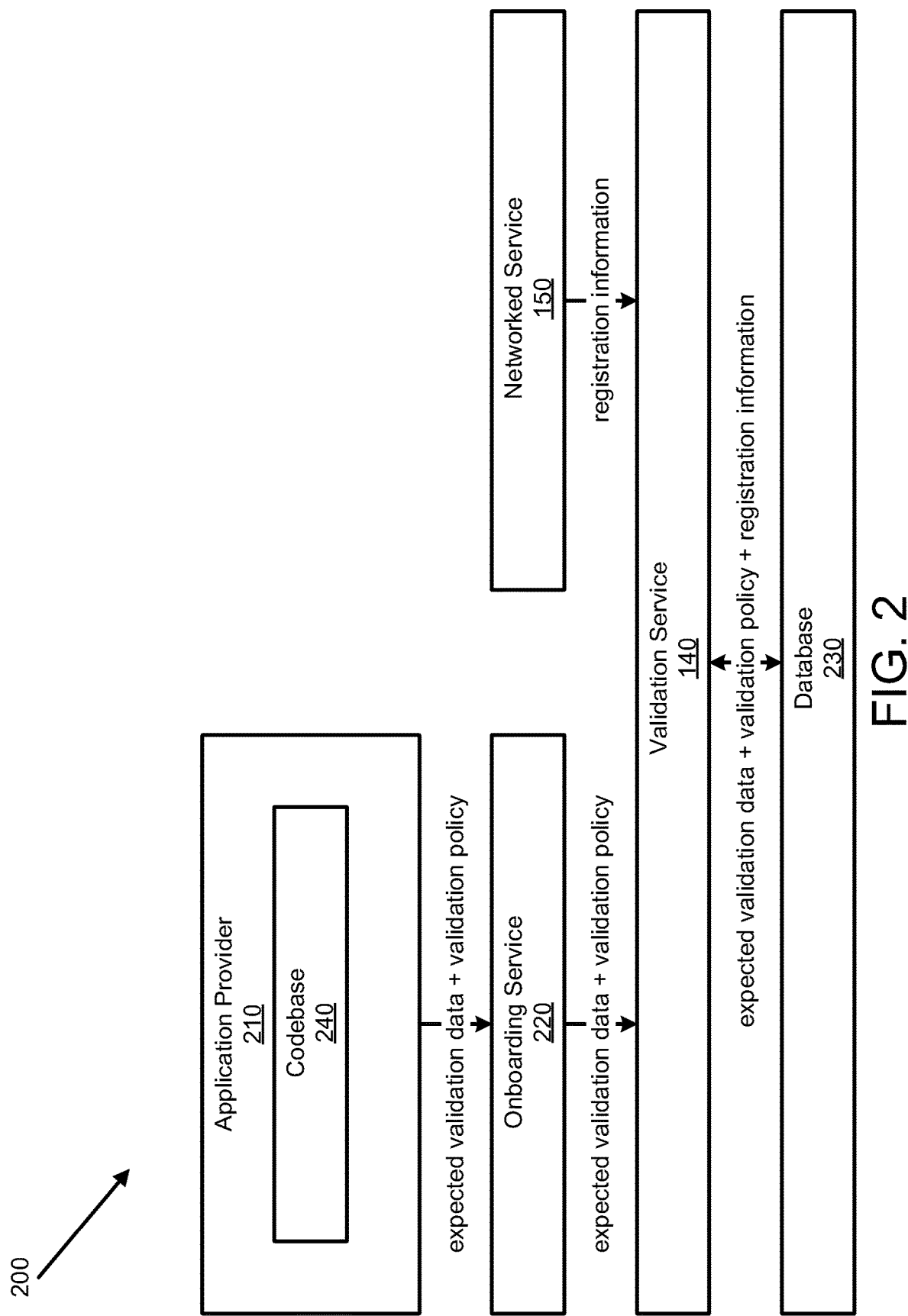
FIG. 2 illustrates an example system for evaluating software posture as a condition of zero trust access, in accordance with some embodiments of the present disclosure.

Validation service 140 can receive the validation code request and proceed to generate a validation code. To evaluate the software posture of application 120 on user device 110, validation service 140 can compare the data in the validation code request with stored data, which can include data representative of expected parameters associated with application 120 on user device 110. The stored data can include a hash derived from expected parameters for application 120 during runtime on a specific operating system 160, static aspects of application 120, deployment attributes of application 120 which are associated with a healthy version of application 120 running on a specific operating system 160, runtime attributes of application 120, or other data. The hash can relate to stateless aspects of code during runtime of application 120 on a specific operating system 160. The stored data can be received from an application provider, as illustrated in FIG. 2.

Validation service 140 can send the validation code to validation agent 130. The validation code can be time-sensitive with the purpose of increasing security. In turn, validation agent 130 can send the validation code to networked service 150. In response, networked service 150 can send a validation request to validation service 140. Validation service 140 can validate the validation code and send the validation of the validation code to networked service 150. In response, networked service 150 can grant access to application 120 running on user device 110.

In a real world example, application 120 can be an application or webpage for a travel service, such as EXPEDIA, and networked service 150 can be a corresponding server, such as an EXPEDIA server. When the travel service application attempts to access the travel service server, validation agent 130 can capture data regarding specific parameters indicating the software posture of the travel service application. This data can demonstrate that the travel service application has not been tampered with.

The specific parameters can be part of a policy with multiple validation factors. For example, a parameter can be a hash value of the runtime parameters of the travel service application code, a static portion or hash of all or part of the travel service application code, or a code flow sequence which updates a global value in a unique way. Validation agent 130 can, for example, generate some or all of these parameters with keys previously provisioned and stored on user device 110. Which parameters are used as validation factors for the policy can, for example, be determined when the travel service application is distributed as illustrated in FIG. 2.

In a broader zero trust model, the software posture of the travel service application can be used in tandem with user identity posture, device posture, and networking environment posture to capture a full posture before allowing or denying access to the travel service server. In some embodiments, validation service 140 can be part of a broader zero trust model.

Validation service 140 can perform similar functions with a second application that integrates with application 120. For example, an EXPEDIA application may run advertisements using GOOGLE ADS. To ensure that the EXPEDIA application has not been tampered with via GOOGLE ADS, validation service 140 can validate GOOGLE ADS as part of the validation process for the EXPEDIA application or in a separate validation process.

FIG. 2 illustrates an example system 200 for evaluating software posture as a condition of zero trust access, in accordance with some embodiments of the present disclosure. Validation service 140 can receive expected validation data and a validation policy from application provider 210, and register networked service 150.

Application provider 210 can be a developer for application 120, such as EXPEDIA for the EXPEDIA application or webpage. Codebase 240 can be the code for application 120. Application provider 210 can send expected validation data to onboarding service 220. The expected validation data can be data representative of expected parameters associated with application 120 on various user devices 110 or running on various operating systems 160. The expected validation data can be runtime information of code from codebase 240. The expected validation data can various parameters. Expected validation data can, for example, indicate data types of parameters, ranges of parameters, specific values of parameters, acceptable combinations of parameters. The expected validation data can be paired with a validation policy to be used by validation service 140. The validation policy can instruct validation service how to compare the expected validation data with the validation data received from application 120 as illustrated in FIG. 1.

Networked service 150 can register with validation service 140. Registration can, for example, include specifying applications 120 which can access networked service 150.

Validation service 140 can receive the expected validation data and validation policy from onboarding service 220. Validation service 140 can receive registration information from networked service 150. Validation service 140 can store data within database 230, which can be an internal or external database. Validation service 140 can access the data in database 230 when performing validation as illustrated in FIG. 1.

FIG. 3 illustrates a flowchart of an example method 300 for evaluating software posture as a condition of zero trust access, in accordance with some embodiments of the present disclosure. Although method 300 depicts a particular sequence of operations, the sequence may be altered without departing from the scope of the present disclosure. For example, some of the operations depicted may be performed in parallel or in a different sequence that does not materially affect the function of method 300. In other examples, different components of an example device or system that implements method 300 may perform functions at substantially the same time or in a specific sequence.

According to some embodiments, method 300 includes storing, by a validation service, data representative of expected parameters associated with the application on the user device at step 310. For example, validation service 140 illustrated in FIG. 1 can store data representative of expected parameters associated with application 120 on user device 110. In some embodiments, the expected parameters for the application relate to stateless aspects of code during runtime on the given operating system. For example, the expected parameters could be a hash or hash-based message authentication code (HMAC) of part of codebase 240 for application 120. The hash or HMAC can be stable over updates or patches, and validation agent 130 can generate the hash or HMAC with a previously securely provisioned key stored on user device 110. The hash or HMAC can be identified by application provider 210 as a good measure of the health of application 120. In some embodiments, the data representative of expected parameters associated with the application on the user device includes a hash derived from expected parameters for the application during runtime on a given operating system. Such parameters can indicate the health of application 120 as it is supposed to run on operating system 160 as opposed to the health of application 120 without context. In some embodiments, the data representative of expected parameters associated with the application on the user device includes static aspects of the application. These static aspects can include portions of code, developer signatures, or other features. In some embodiments, the data representative of expected parameters associated with the application on the user device includes application deployment attributes that characterize a healthy version of the application on a particular version of an operating system. Such deployment attributes can indicate that application 120 deployed properly, which illustrates a healthy starting point for application 120. In some embodiments, the data representative of expected parameters associated with the application on the user device includes runtime attributes. These parameters can indicate in-real-time abnormalities to the execution of application 120 on user device 110.

According to some embodiments, method 300 includes receiving, from a validation agent running on the user device, data representative of parameters associated with the application executing on the user device at step 320. For example, validation service 140 illustrated in FIG. 1 can receive, from validation agent 130 running on user device 110, data representative of parameters associated with the application executing on the user device. In some embodiments, the application executing on the user device can be attempting to gain access to a networked service.

According to some embodiments, method 300 includes comparing, by the validation service, the data representative of expected parameters associated with the application on the user device with the data representative of parameters associated with the application executing on the user device at step 330. For example, validation service 140 illustrated in FIG. 1 can compare the data representative of expected parameters associated with application 120 on user device 110 with the data representative of parameters associated with application 120 executing on user device 110.

According to some embodiments, method 300 includes when the data representative of expected parameters associated with the application on the user device matches the data representative of parameters associated with the application executing on the user device, generating, by the validation service, a validation code for the application based on the parameters at step 340. For example, validation service 140 illustrated in FIG. 1 can, when the data representative of expected parameters associated with application 120 on user device 110 matches the data representative of parameters associated with application 120 executing on user device 110, generate a validation code for application 120 based on the parameters.

According to some embodiments, method 300 includes sending, to the user device, the validation code at step 350. For example, validation service 140 illustrated in FIG. 1 can send, to user device 110, the validation code.

According to some embodiments, method 300 includes receiving, from the networked service, a request for validation of the validation code at step 360. For example, validation service 140 illustrated in FIG. 1 can receive, from networked service 150, a request for validation of the validation code.

According to some embodiments, method 300 includes sending, to the networked service, a validation of the validation code, whereby the networked service permits further communications with the application executing on the user device at step 370. For example, validation service 140 illustrated in FIG. 1 can send, to networked service 150, a validation of the validation code, whereby networked service 150 permits further communications with application 120 executing on user device 110.

In some embodiments, method 300 includes storing data representative of expected parameters associated with a second application on the user device, wherein the second application can integrate with the application. In some embodiments, method 300 includes receiving, from the validation agent running on the user device, data representative of parameters associated with the second application executing on the user device, wherein the second application is integrated with the application. In some embodiments, method 300 includes comparing, by the validation service, the data representative of expected parameters associated with the second application on the user device with the data representative of parameters associated with the second application executing on the user device. For example, validation service 140 illustrated in FIG. 1 can perform these steps of method 300.

In some embodiments, method 300 includes registering runtime information of code associated with the application. In some embodiments, method 300 includes registering the networked service with the validation service. For example, validation service 140 illustrated in FIG. 2 can perform these steps of method 300.

Figure 4:
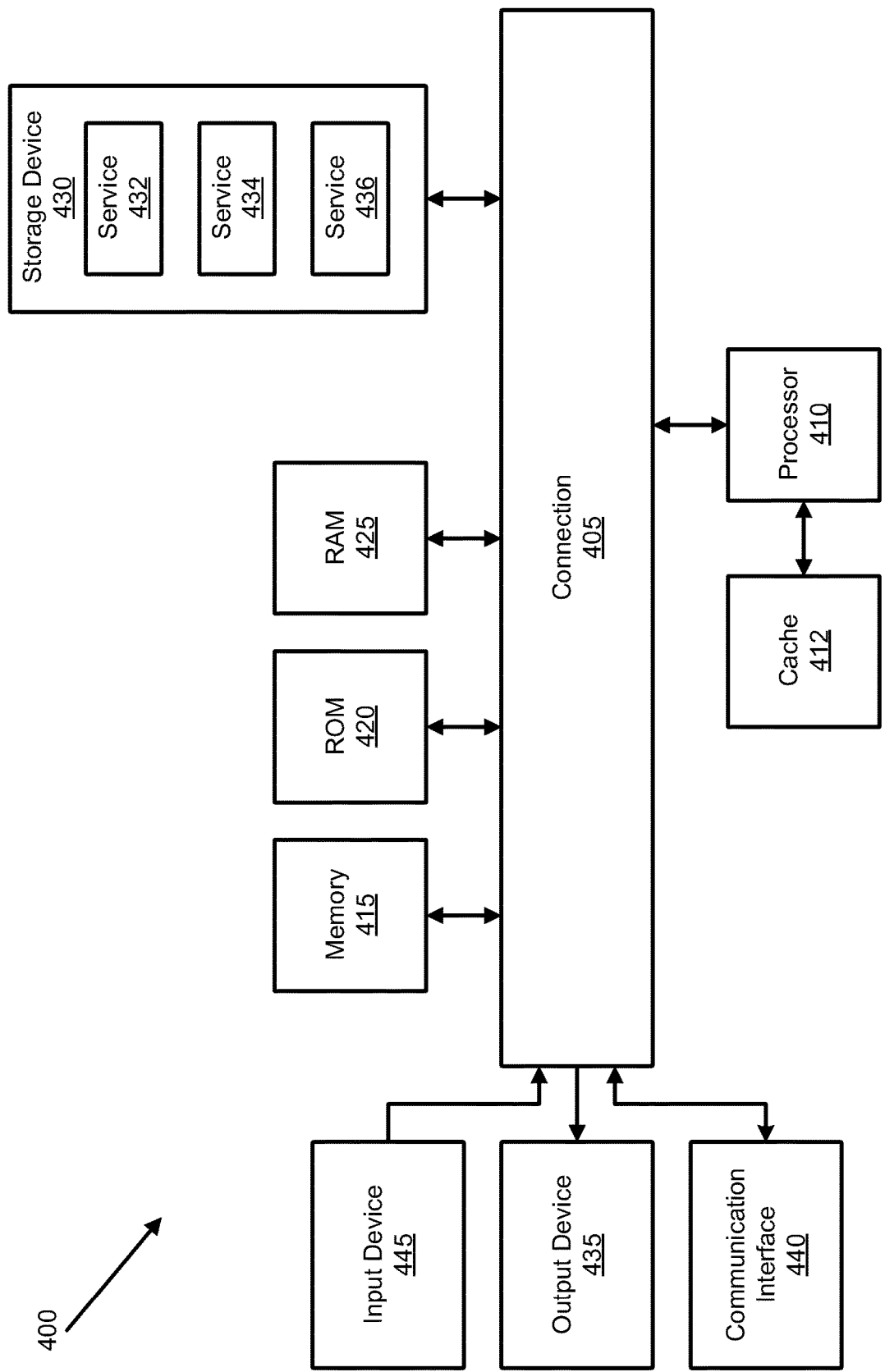
FIG. 4 illustrates an example system for implementing certain aspects of the present technology, in accordance with some embodiments of the present disclosure.

FIG. 4 shows an example of computing system 400, which can be for example any computing device making up validation service 140, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method for evaluating software posture of an application executing on a user device comprising:
    storing, by a validation service, data representative of expected parameters associated with the application on the user device, wherein the data representative of the expected parameters can be a hash value of runtime parameters of the application, a hash of a static portion of application code, a hash of a code flow sequence, static application attributes, run time attributes, or application deployment attributes;
    receiving, from a validation agent running on the user device, data representative of parameters associated with the application executing on the user device, wherein the application executing on the ulser device is attempting to gain access to a networked service;
    comparing, by the validation service, the data representative of expected parameters associated with the application on the user device with the data representative of parameters associated with the application executing on the user device;
    when the data representative of expected parameters associated with the application on the user device matches the data representative of parameters associated with the application executing on the user device, generating, by the validation service, a validation code for the application based on the parameters;
    sending, to the user device, the validation code;
    receiving, from the networked service, a request for validation of the validation code; and
    sending, to the networked service, a validation of the validation code, whereby the networked service permits further communications with the application executing on the user device.

2. The method of claim 1, further comprising:
    storing data representative of expected parameters associated with a second application on the user device, wherein the second application can integrate with the application;
    receiving, from the validation agent running on the user device, data representative of parameters associated with the second application executing on the user device, wherein the second application is integrated with the application; and
    comparing, by the validation service, the data representative of expected parameters associated with the second application on the user device with the data representative of parameters associated with the second application executing on the user device.

3. The method of claim 1, wherein the expected parameters for the application relate to stateless aspects of code during runtime on a given operating system.

4. The method of claim 1, wherein the application deployment attributes characterize a healthy version of the application on a particular version of an operating system.

5. The method of claim 1, further comprising:
    registering runtime information of code associated with the application; and
    registering the networked service with the validation service.

6. A system comprising:
    one or more processors;
    at least one computer-readable storage medium having instructions stored thereon, wherein the instructions, when executed by the one or more processors, are effective to cause the one or more processors to:
        store, by a validation service, data representative of expected parameters associated with an application on a user device, wherein the data representative of the expected parameters can be a hash value of runtime parameters of the application, a hash of a static portion of application code, a hash of a code flow sequence, static application attributes, run time attributes, or application deployment attributes;
        receive, from a validation agent running on the user device, data representative of parameters associated with the application executing on the user device, wherein the application executing on the user device is attempting to gain access to a networked service;
        compare, by the validation service, the data representative of expected parameters associated with the application on the user device with the data representative of parameters associated with the application executing on the user device;
        when the data representative of expected parameters associated with the application on the user device matches the data representative of parameters associated with the application executing on the user device, generate, by the validation service, a validation code for the application based on the parameters;
        send, to the user device, the validation code;
        receive, from the networked service, a request for validation of the validation code; and
        send, to the networked service, a validation of the validation code, whereby the networked service permits further communications with the application executing on the user device.

7. The system of claim 6, wherein the instructions, when executed by the one or more processors, are further effective to cause the one or more processors to:
    store data representative of expected parameters associated with a second application on the user device, wherein the second application can integrate with the application;
    receive, from the validation agent running on the user device, data representative of parameters associated with the second application executing on the user device, wherein the second application is integrated with the application; and
    compare, by the validation service, the data representative of expected parameters associated with the second application on the user device with the data representative of parameters associated with the second application executing on the user device.

8. The system of claim 6, wherein the expected parameters for the application relate to stateless aspects of code during runtime on a given operating system.

9. The system of claim 6, wherein the instructions, when executed by the one or more processors, are further effective to cause the one or more processors to:
register runtime information of code associated with the application; and
register the networked service with the validation service.

10. A non-transitory computer-readable storage medium having instructions stored thereon, wherein the instructions, when executed by a processor, are effective to cause the processor to:
store, by a validation service, data representative of expected parameters associated with an application on a user device, wherein the data representative of the expected parameters can be a hash value of runtime parameters of the application, a hash of a static portion of application code, a hash of a code flow sequence, static application attributes, run time attributes, or application deployment attributes;
receive, from a validation agent running on the user device, data representative of parameters associated with the application executing on the user device, wherein the application executing on the user device is attempting to gain access to a networked service;
compare, by the validation service, the data representative of expected parameters associated with the application on the user device with the data representative of parameters associated with the application executing on the user device;
when the data representative of expected parameters associated with the application on the user device matches the data representative of parameters associated with the application executing on the user device, generate, by the validation service, a validation code for the application based on the parameters;
send, to the user device, the validation code;
receive, from the networked service, a request for validation of the validation code; and
send, to the networked service, a validation of the validation code, whereby the networked service permits further communications with the application executing on the user device.

11. The non-transitory computer-readable storage medium of claim 10, wherein the instructions, when executed by the processor, are further effective to cause the processor to:
store data representative of expected parameters associated with a second application on the user device, wherein the second application can integrate with the application;
receive, from the validation agent running on the user device, data representative of parameters associated with the second application executing on the user device, wherein the second application is integrated with the application; and
compare, by the validation service, the data representative of expected parameters associated with the second application on the user device with the data representative of parameters associated with the second application executing on the user device.

12. The non-transitory computer-readable storage medium of claim 10, wherein the application deployment attributes characterize a healthy version of the application on a particular version of an operating system.

13. The non-transitory computer-readable storage medium of claim 10, wherein the instructions, when executed by the processor, are further effective to cause the processor to:
register runtime information of code associated with the application; and
register the networked service with the validation service.

* * * * *